Jan. 10, 1956 G. F. ZIFFER 2,730,695
MAGNETIC SHIFT REGISTERS
Filed Jan. 26, 1953
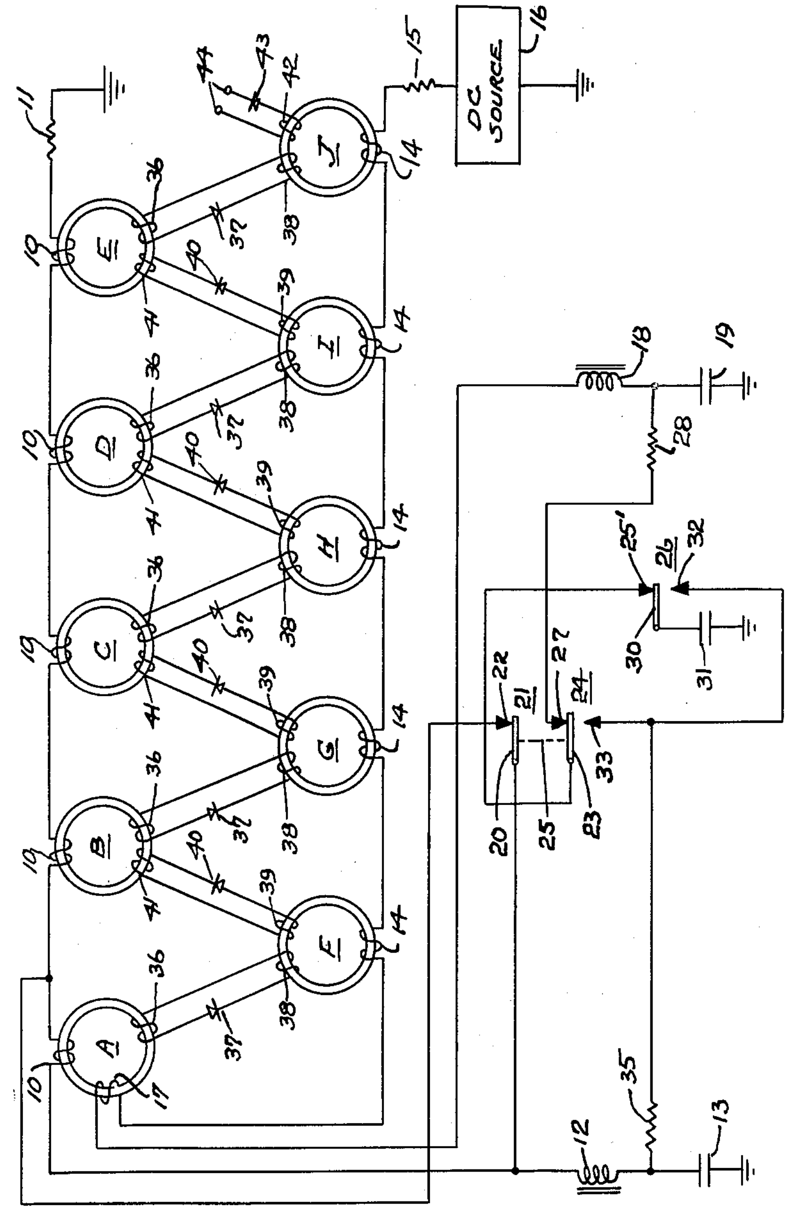
INVENTOR.
GARRET F. ZIFFER
BY
Robert T. Palmer
Attorney United States Patent Office 2,730,695

Patented Jan. 10, 1956

2,730,695

MAGNETIC SHIFT REGISTERS

Garret F. Ziffer, Cambridge, Mass., assignor to American Machine & Foundry Company, a corporation of New Jersey Application January 26, 1953, Serial No. 333,159

10 Claims. (Cl. 340—174)

This invention relates to magnetic memory circuits, and relates more particularly to magnetic binary shift registers.

In electronic computing systems, a shift register used for the storage of binary information, requires successive shifting pulses to be applied alternately to shift windings on a line of storage cores, and to shift windings on a line of temporary storage cores. For providing such shift pulses, it has been the practice to use two blocking oscillators with the addition of a multi-vibrator or other such programming device to trigger the oscillators alternately at the desired times. A simplified shift pulse generator is disclosed in the Carter-Hammel Patent No. 2,591,406. All such prior shift pulse generators have required electronic tubes with their need for standby power and warm-up time.

An object of this invention is to simplify the equipment required for inserting information into a shift register, and for providing shift current pulses.

Another object of this invention is to insert information into a shift register, and to shift the latter without the use of electronic tubes.

This invention will now be described with reference to the drawing which is a circuit schematic of one embodiment of the invention.

The shift register illustrated by the drawing comprises a line of storage cores A, B, C, D and E, and a line of temporary storage cores F, G, H, I and J. These cores are of the type disclosed in said Carter-Hammel patent, and are capable of being magnetized to saturation in either of two directions. Two states are said to arise from the two directions: a positive or active state in which the direction of retentivity is opposite to that which would result from the application of a sensing or shift pulse to a shift winding on a core; and a negative or inactive state in which the direction of retentivity is the same as that which would result from the application of a shift pulse to the shift winding. When applied to a core in the active state, a shift current pulse will cause the inactive state to appear. When applied to a core already in the inactive state, a shift current pulse will cause no change in state.

In digital work, a core in the active state is said to store a binary digit "one," and a core in the inactive state is said to contain the digit "zero." When a core is shifted from one state to the other, a voltage is induced in all the windings on it. A "one" signal is thus the voltage induced by a change in core state caused by a shift pulse, and a "zero" is the relatively small parasitic voltage occurring when there is no change in state caused by a shift pulse.

Referring now to the drawing, the storage cores A, B, C, D and E have the similar shift windings 10 thereon, connected in series, the core E having its shift winding 10 connected through the resistor 11 to ground. The winding 10 on the first storage core A is connected in series with the inductor 12 and the capacitor 13 to ground.

The shift windings 14 on the temporary storage cores

F, G, H, I and J are also connected in series. The winding 14 on the last core J is connected to a resistor 15 in series with a high voltage D. C. source 16 to ground. The winding 14 on the core F is connected in series with the signal input winding 17 on the core A, the inductor 18 and the capacitor 19 to ground.

The switch arm 20 of the switch 21 is connected to the junction of the winding 10 on the core A and the inductor 12. The contact 22 of the switch is connected to the opposite end of the winding 10 on the core A from that connected to the switch arm 20 whereby when the switch is closed, the winding 10 on the core A is short-circuited by the switch.

The switch arm 23 of the switch 24 is connected by the linkage 25 to the switch arm 20 of the switch 21 whereby both switches are depressed simultaneously as will be described. The switch arm 23 is connected to the contact 25′ of the switch 26. The contact 27 of the switch 24 is connected through the resistor 28 to the junction of the capacitor 19 and the inductor 18.

The arm 30 of the switch 26 is connected through the capacitor 31 to ground. Its contact 32 is connected to the contact 33 of the switch 24, and through the resistor 35 to the junction of the inductor 12 and the capacitor 13.

The cores A—E have the output windings connected through the diodes 37 to the corresponding input windings 38 on the cores F—J. The cores F—I have the output windings 39 connected through the diodes 40 to the corresponding input windings 41 on the cores B—E. The core J has a read-out winding 42 connected through the diode 43 to the output connections 44. Output connections can also be connected across or in series with the output windings on the temporary storage cores as is usual in some shift registers.

*Operation*

The capacitor 31 is normally connected through the switch arm 30, the contact 25′, the switch arm 23, the contact 27, the resistor 28, the inductor 18, the winding 17 on the core A and the shift windings 14 on the cores F—J, to the D. C. source, and is charged to the voltage of the source, which, for example, may be 500 volts. Upon movement of the switch arm 30 against its contact 32, the capacitor 31 will discharge, when the switch 21 is open, through the shift windings 10 of tthe storage cores A—E, through its connections through the resistor 35 and the inductor 12 to such shift windings. Likewise when the switch 21 is open and the switch arm 23 is moved against its contact 33 when the switch arm 30 is against its contact 25′, the capacitor 31 will be connected through the switch arm 30, the contact 25′, the switch arm 23, the contact 33, the resistor 35 and the inductor 12 to the shift windings 10 on the storage cores A—E, and will discharge through such windings. When the capacitor 31 discharges through the shift windings 10, the information stored in the cores A—E will be shifted through the output windings 36 and input windings 38 to the temporary storage cores F—J.

Upon reversal of either switch 24 or 26 from a position connecting the shift windings 10 to the capacitor 31, to the position shown by the drawing, the capacitor 31 will be recharged by the source 16 causing a shift current pulse to flow through the input winding 17 on the core A and the shift windings 14 on the temporary storage cores F—I, causing the information stored in these cores to be shifted through the output windings 39 and the input windings 41 to the line of storage cores B—E. At this time information stored in the core J may be read out at connections 44.

The charging current of the capacitor 31 flows through the input winding 17 on the first storage core A, and the polarity of this winding is such that this current will insert a "one" in the core A every time the switches 24 and 26 are adjusted to connect the capacitor 31 to the winding 17.

When the switch arm 23 is depressed against its contact 33 for connecting the capacitor 31 to the shift windings 10 of the storage cores A—E, the switch 21 will open, since the two switches are mechanically interconnected, so that the short across the winding 10 on the core A is removed permitting a shift pulse to pass through this winding, clearing the core A and shifting the "one" stored therein into the core F.

When the switch arm 30 of the switch 26 is moved against its contact 32 for connecting the capacitor 31 to the shift windings 10, the switch 21 will be closed so that a shift current pulse cannot be passed through the shift winding on the first storage core A. The core A cannot, therefore, be cleared by this shift pulse so that the net effect is that a "zero" is inserted into the first temporary storage core F.

It is thus apparent that binary numbers can be shifted through the shift register by depressing switch arm 23 for "one" shifts and depressing switch arm 30 for "zero" shifts. Each digit will automatically advance one stage as a new digit is shifted.

The inductors 12 and 18 which in a successful model of the invention were one henry each, and the resistors 11 and 15 which were 1,000 ohms each, were found to be necessary for proper shaping of the shift current pulses.

For as rapid insertion of information as possible, snap-action switches were used. Such switches are characterized by switch bounce lasting several hundred micro-seconds. To alleviate this condition, the capacitors 13 and 19 which had values of 0.5 mfd. each were used. The capacitor 31 had a value of 2.0 mfd., and the resistors 28 and 35 which were for limiting the initial surge from capacitor 31 to capacitors 13 and 19, each had a value of 6.8 ohms.

The switches 21, 24 and 26 can be manually operated as is common in calculating machine practice, or can be automatically operated as by limit switches on a conveyor for purposes of identification, sorting or quality control.

While the shift register illustrated employs five stages only, as many stages as are required may be added since except for the manner of providing shift pulses and of inserting information, conventional shift register practice can be employed.

This invention makes possible the rapid manual or mechanical insertion into magnetic shift registers, of binary data, for purposes of computating and decoding. It requires no stand-by drain on a power supply, and since it requires no warm-up time, is instantly ready for operation.

While one embodiment of the invention has been described for the purpose of illustration, it should be understood that the invention is not limited to the exact circuit and circuit components illustrated, since departures therefrom may be suggested by those skilled in the art, without departure from the essence of the invention.

What is claimed is:

1. A magnetic shift register comprising a line of storage cores, a line of temporary storage cores, shift windings on said cores, an input winding on the first core in order in said line of storage cores connected in series with the shift windings on said temporary storage cores, a two position switch, and means including said switch for supplying a shift current pulse to the shift windings on said storage cores when said switch is in one position, and for supplying a shift current pulse to said input winding and said shift windings on said temporary storage cores when the switch is in the other position.

2. A magnetic shift register as claimed in claim 1 in which said means includes a capacitor and an electric source for charging said capacitor, and in which said switch in said one position connects said capacitor to said shift windings on said storage cores for discharging said capacitor therethrough, and in which said switch in said other position connects said capacitor through said input winding and said shift windings on said temporary cores to said source for charging said capacitor.

3. A magnetic shift register comprising a line of storage cores, a line of temporary storage cores, shift windings on said cores, a first two position switch, a second two position switch, means including either of said switches for supplying a shift current pulse to said shift windings on said storage cores when either of said switches is in one of its two positions, and for supplying a shift current pulse to said shift windings on said temporary storage cores when said switches are in the other of their two positions, and a third switch connected across the shift winding on the first in order of said storage cores, said third switch being mechanically linked to said first switch so as to be closed thereby when said first switch is in its said one position.

4. A magnetic shift register as claimed in claim 3 in which the first in order of said storage cores has an input winding connected in series with the shift windings on the temporary storage cores.

5. A magnetic shift register as claimed in claim 3 in which said means includes a capacitor and an electric source for charging the capacitor, and in which either of said first or second switches in its said one position connects said capacitor to said shift windings on said storage cores for discharging said capacitor therethrough, and in which said first and second switches in their other positions connects said capacitor through said shift windings on said temporary storage cores to said electric source for charging said capacitor.

6. A magnetic shift register as claimed in claim 5 in which the first in order of said storage cores has an input winding connected in series with the shift windings on said temporary storage cores.

7. A magnetic shift register comprising a line of storage cores, a line of temporary storage cores, shift windings on said cores, a two position switch, a capacitor, an electric source, means for connecting said capacitor, said shift windings of one of said lines of cores and said source in series for charging said capacitor when said switch is in one of its two positions, and means for connecting said capacitor in series with said shift windings of the other of said lines of cores for discharging said capacitor through said last mentioned shift windings when said switch is in its other position.

8. A magnetic shift register as claimed in claim 7 in which a core of one of said lines has an input winding thereon connected in series with the shift windings on the cores of the other of said lines.

9. A magnetic shift register comprising a line of storage cores, series connected windings on said cores, a line of temporary storage cores, shift windings on said temporary storage cores, said last mentioned shift windings being connected in series, an electric source connected to said shift windings on said temporary storage cores, a capacitor, a two position switch, means including said switch when in one position for connecting said capacitor and said shift windings of said storage cores in series, an input winding on the first in order of said storage cores connected in series with said shift windings on said temporary storages cores, a second switch automatically operable with said first switch and being connected across said shift winding on said first storage core when said first switch is in said other position for shorting out said last mentioned shift winding, a third, two position switch, means including said last mentioned switch when in one of its two positions for connecting said capacitor and said shift windings on said storage cores in series when said second switch is open, and means including said first and said third switch when in their other positions for connecting said capacitor, said input winding, said shift windings of said temporary storage cores and said source in series.

10. A magnetic shift register comprising a line of storage cores, a line of temporary storage cores, shift windings on said cores, an input winding on the first core in order of said storage cores connected in series with the shift windings on said temporary storage cores, a first switch connected to the ends of the shift winding on said first core, a two position switch mechanically linked to said first switch, a first shift current supply circuit including said two position switch for supplying a shift current pulse to said input winding and said shift windings on said temporary storage cores when said two position switch is in one position, said first switch being closed when said two position switch is said one position for shorting the shift winding on said first core, a second shift current supply circuit including said two position switch for supplying a shift current pulse to said shift windings on said storage cores when said two position switch is in its other position, said first switch being open when said two position switch is in said other position, a third switch, and means including said third switch and said second circuit without said two position switch for supplying a shift current pulse to said shift windings on said storage cores.

References Cited in the file of this patent

UNITED STATES PATENTS

| | | |
|---|---|---|
| 2,591,406 | Carter et al. | Apr. 1, 1952 |
| 2,652,501 | Wilson | Sept. 15, 1953 |
| 2,654,080 | Browne | Sept. 29, 1953 |